(12) United States Patent
Huang et al.

(10) Patent No.: US 12,307,690 B2
(45) Date of Patent: May 20, 2025

(54) MULTI-MODAL IMAGE ALIGNMENT METHOD AND SYSTEM

(71) Applicant: INDUSTRIAL TECHNOLOGY RESEARCH INSTITUTE, Hsinchu (TW)

(72) Inventors: Jay Huang, Tainan (TW); Hian-Kun Tenn, Tainan (TW); Wen-Hung Ting, Tainan (TW); Chia-Chang Li, Pingtung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 481 days.

(21) Appl. No.: 17/866,354

(22) Filed: Jul. 15, 2022

(65) Prior Publication Data

US 2023/0055649 A1 Feb. 23, 2023

Related U.S. Application Data

(60) Provisional application No. 63/234,924, filed on Aug. 19, 2021.

(30) Foreign Application Priority Data

Dec. 10, 2021 (TW) .................................. 110146318

(51) Int. Cl.
G06K 9/36 (2006.01)
G06T 7/33 (2017.01)
(Continued)

(52) U.S. Cl.
CPC .................. *G06T 7/33* (2017.01); *G06T 7/60* (2013.01); *G06T 7/80* (2017.01);
(Continued)

(58) Field of Classification Search
None
See application file for complete search history.

(56) References Cited

U.S. PATENT DOCUMENTS 5,764,786 A * 6/1998 Kuwashima .............. G01S 5/16
  348/E5.042
7,789,562 B2 * 9/2010 Strobel .................. A61B 6/032
  378/207
(Continued)

FOREIGN PATENT DOCUMENTS

CN 106846461 A 6/2017
CN 107564089 A * 1/2018
(Continued)

OTHER PUBLICATIONS

Walch et al., "A combined calibration of 2D and 3D sensors a novel calibration for laser triangulation sensors based on point correspondences," 2014 International Conference on Computer Vision Theory and Applications (VISAPP), Lisbon, Portugal, 2014, pp. 89-95. (Year: 2014).*

(Continued)

*Primary Examiner* — Feng Niu
(74) *Attorney, Agent, or Firm* — Maschoff Brennan

(57) ABSTRACT

A multi-modal image alignment method includes obtaining first points corresponding to a center vertex of a calibration object and second point groups corresponding to side vertices of the calibration object from two-dimensional images, obtaining third points corresponding to the center vertex from three-dimensional images, performing first optimizing computation using a first coordinate system associated with the two-dimensional images, the first points and the third points to obtain a first transformation matrix, processing on the three-dimensional images using the first transformation matrix to generate firstly-transformed images respectively, performing second optimizing computation using the firstly- (Continued)

transformed images, the first points and the second point groups to obtain a second transformation matrix, and transforming an image to be processed from a second coordinate system associated with the three-dimensional images to the first coordinate system using the first transformation matrix and the second transformation matrix.

10 Claims, 10 Drawing Sheets

(51) Int. Cl.
    *G06T 7/60*     (2017.01)
    *G06T 7/80*     (2017.01)

(52) U.S. Cl.
    CPC   *G05B 2219/35063* (2013.01); *G06T 2200/04* (2013.01); *G06T 2207/10028* (2013.01); *Y02T 10/40* (2013.01)

(56) References Cited

U.S. PATENT DOCUMENTS

| | | | |
|---|---|---|---|
| 9,270,974 | B2 | 2/2016 | Zhang et al. |
| 9,325,969 | B2 | 4/2016 | Takemoto et al. |
| 10,129,490 | B2 | 11/2018 | Beall |
| 10,445,898 | B2 | 10/2019 | Liu et al. |
| 10,796,403 | B2 | 10/2020 | Choi et al. |
| 11,030,763 | B1 * | 6/2021 | Srivastava ............ G06T 7/593 |
| 2005/0075585 | A1 * | 4/2005 | Kim .................... A61C 19/045 |
| | | | 600/590 |
| 2009/0296893 | A1 * | 12/2009 | Strobel ................ A61B 6/032 |
| | | | 378/207 |
| 2019/0279399 | A1 | 9/2019 | Yasunaga et al. |
| 2021/0174529 | A1 * | 6/2021 | Srivastava .............. G06T 7/62 |
| 2021/0209750 | A1 | 7/2021 | Aponte et al. |
| 2021/0243369 | A1 | 8/2021 | Dal Mutto et al. |

FOREIGN PATENT DOCUMENTS

| | | | |
|---|---|---|---|
| CN | 207218846 U | * | 4/2018 |
| CN | 110648367 A | | 1/2020 |
| CN | 114545377 A | * | 5/2022 |
| JP | 2002328012 A | * | 11/2002 |
| JP | 2002328013 A | * | 11/2002 |
| JP | 2002328014 A | * | 11/2002 |
| KR | 20110006360 A | * | 1/2011 |
| KR | 20140049361 A | * | 4/2014 |
| WO | WO-2019163211 A1 | * | 8/2019 |
| WO | WO-2019163212 A1 | * | 8/2019 |

OTHER PUBLICATIONS

CN 107564089 A (machine translation) (Year: 2018).*
CN 114545377 A (machine translation) (Year: 2022).*
CN 207218846 U (machine translation) (Year: 2018).*
JP 2002328012 A (machine translation) (Year: 2002).*
JP 2002328013 A (machine translation) (Year: 2002).*
JP 2002328014 A (machine translation) (Year: 2002).*
KR 20110006360 A (machine translation) (Year: 2011).*
KR 20140049361 A (machine translation) (Year: 2014).*
WO 2019163211 A1 (machine translation) (Year: 2019).*
WO 2019163212 A1 (machine translation) (Year: 2019).*
Rangel et al. "3D Thermal Imaging: Fusion of Thermography and Depth Cameras" University of Kassel, Faculty of Mechanical Engineering, Measurement and Control Department, Jan. 2014.
Vidas et al. "3D Thermal Mapping of Building Interiors using an RGB-D and Thermal Camera" 2013 IEEE International Conference on Robotics and Automation (ICRA) May 6-10, 2013.
Mouats et al. "Thermal Stereo Odometry for UAVs" IEEE Sensors Journal, vol. 15, No. 11, Nov. 2015.
TW Office Action in TW application No. 110146318 dated May 5, 2022.

* cited by examiner

MULTI-MODAL IMAGE ALIGNMENT METHOD AND SYSTEM

CROSS-REFERENCE TO RELATED APPLICATIONS

This non-provisional application claims priority under 35 U.S.C. § 119 (a) on provisional application Nos. 63/234,924 filed in the US on Aug. 19, 2021, and on patent application No(s). 110146318 filed in Republic of China on Dec. 10, 2021, the entire contents of which are hereby incorporated by reference.

BACKGROUND

1. Technical Field

The disclosure relates to a multi-modal image alignment method, and particularly to an alignment method of a three-dimensional (3D) image and a two-dimensional (2D) image.

2. Related Art

In the post-pandemic era, technology, economic, culture, and public health aspects have entered a new normal globally. Countries went from preventing the spread of virus to coexisting with the virus, and the lifestyle of the public has also changed. Except for wearing a mask when going out, people must take their body temperature when entering various indoor places. Most of the common body temperature measurement systems on the market are only for temperature measurement. When body temperature measurement has become a daily routine, the expansion of system functions, such as physiological signal measurement, motion detection, etc., should be taken into consideration.

The basic measurement signal for the above-mentioned multi-function requirements of one machine is mostly body temperature, pulse, breathing and behaviors, etc. The required non-contact measurement sources are mostly visible light images, thermal image and 3D image (point cloud). Considering the cost, the current mainstream method is to mix and match image capturing devices of various affordable brands to try to meet the demands of a multi-function device. However, the coordinate system of each image capturing device are different from each other, the multi-mode of a target may not be obtained at the same time.

SUMMARY

According to one or more embodiment of this disclosure, a multi-modal image alignment method includes performing by a processing device, the steps including: obtaining a plurality of two-dimensional (2D) images and a plurality of three-dimensional (3D) images associated with a calibration object, wherein the calibration object comprises a center vertex and a plurality of side vertices, the plurality of 2D images are associated with a first 3D coordinate system, and the plurality of 3D images are associated with a second 3D coordinate system; obtaining a plurality of first points corresponding to the center vertex and a plurality of second point groups corresponding to the plurality of side vertices from the plurality of 2D images; obtaining a plurality of third points corresponding to the center vertex from the plurality of 3D images; performing the first optimizing computation based on the first 3D coordinate system by using an initial first transformation matrix, the plurality of first points and the plurality of third points to obtain an optimized first transformation matrix; processing on the plurality of 3D images by using the optimized first transformation matrix to generate a plurality of firstly-transformed images respectively; performing the second optimizing computation based on the first 3D coordinate system by using the plurality of firstly-transformed images, the plurality of first points, the plurality of second point groups and a predetermined specification parameter set of the calibration object to obtain an optimized second transformation matrix; and transforming an image to be processed to the second 3D coordinate system or the first 3D coordinate system by using the optimized first transformation matrix and the optimized second transformation matrix.

According to one or more embodiment of this disclosure, a multi-modal image alignment system includes: a calibration object, comprising: a main body having a center vertex and a plurality of side vertices; and a plurality of indicators respectively disposed on the center vertex and the plurality of side vertices; a 2D image capturing device having a first 3D coordinate system, and configured to generate a plurality of 2D images associated with the calibration object; a 3D image capturing device having a second 3D coordinate system, and configured to generate a plurality of 3D images associated with the calibration object; and a processing device connected to the 2D image capturing device and the 3D image capturing device, and configured to obtain a coordinate transformation matrix according to the plurality of 2D images and the plurality of 3D images, and transform an image to be processed to the second 3D coordinate system or the first 3D coordinate system by using the coordinate transformation matrix.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
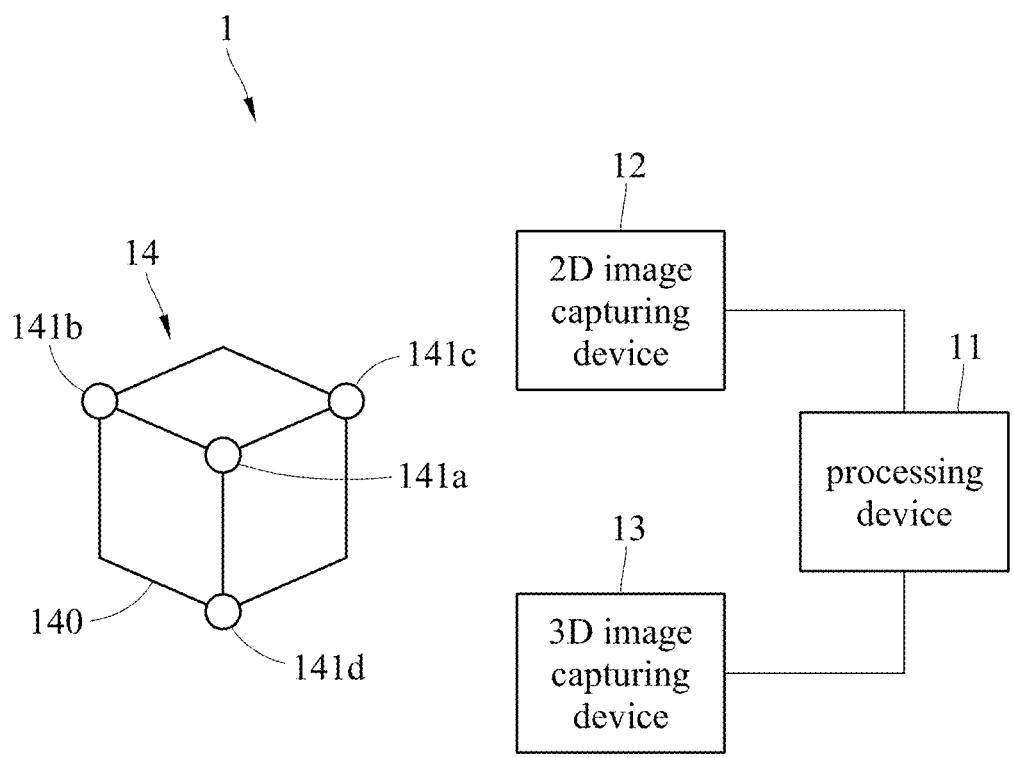
FIG. 1 is a function block diagram of a multi-modal image alignment system according to an embodiment of the disclosure.

Please refer to FIG. 1. FIG. 1 is a function block diagram of a multi-modal image alignment system 1 according to an embodiment of the disclosure. As shown in FIG. 1, the multi-modal image alignment system 1 includes a processing device 11, a two-dimensional (2D) image capturing device 12, a three-dimensional (3D) image capturing device 13 and a calibration object 14, wherein the processing device 11 may be connected to the 2D image capturing device 12 and the 3D image capturing device 13 in a wired way or in a wireless way.

The processing device 11 may include, but not limited to, a single processor and an integration of a plurality of microprocessors, such as a central processing unit (CPU), a graphics processing unit (GPU), etc. The processing device 11 is configured to obtain a transformation matrix of the coordinate systems of the 2D image capturing device 12 and the 3D image capturing device according to images generated by photographing the calibration object 14 by the 2D image capturing device 12 and the 3D image capturing device 13, and the details are described below. The processing device 11 may use said transformation matrix to map the image generated by the 3D image capturing device 13 to the image generated by the 2D image capturing device 12 to generate an overlay image.

The 2D image capturing device 12 is, for example, an ambient light camera, a near infrared camera, a thermal imager, etc. The 2D image capturing device 12 is configured to take a 2D image and has a camera coordinate system and an image plane coordinate system. The 3D image capturing device 13 is, for example, a 3D point cloud sensor, a depth camera, etc. The 3D image capturing device 13 is configured to take a 3D image and has a camera coordinate system. The 2D image capturing device 12 and the 3D image capturing device 13 may be disposed in the same casing, or may be respectively disposed in different casings.

The calibration object 14 includes a main body 140 and a plurality of indicators 141a-141d. The 3D main body 140 may have four or more vertices. FIG. 1 exemplarily illustrates the 3D main body 140 as a hexahedron, but the 3D main body 140 is not limited thereto. The indicators 141a-141d may be respectively disposed at the vertices of the 3D main body 140, wherein the number of the indicators 141a-141d is at least four. The indicators 141a-141d may all be light-emitting elements, may all be heating elements, or may all be elements with both light-emitting and heating functions. The indicators 141a-141d may all have the same color or/and temperature, or may respectively have different colors or/and temperatures.

More particularly, the types of the indicators 141a-141d may depend on the type of the 2D image capturing device 12. In an implementation where an ambient light camera is regarded as the 2D image capturing device, the indicators 141a-141d may be implemented with light-emitting elements. In an implementation where a near infrared camera or a thermal imager is regarded as the 2D image capturing device 12, the indicators 141a-141d are implemented with heating elements. In another embodiment, the multi-modal image alignment system 1 may further include another 2D image capturing device. If the two 2D image capturing devices are respectively an ambient light camera and a thermal imager, the indicators 141a-141d are implemented with elements with both light-emitting and heating functions.

The calibration object 14, the 2D image capturing device 12 and the 3D image capturing device 13 of the multi-modal image alignment system 1 may collaborate to generate data for the processing device 11 to perform multi-modal image calibration. The calibration object 14 may be placed at a plurality of calibration positions in turn. The 2D image capturing device 12 may be controlled to photograph the calibration object 14 placed at different calibration positions in turn to generate a plurality of 2D images. The 3D image capturing device 13 may be controlled to photograph the calibration object 14 placed at different calibration positions in turn to generate a plurality of 3D images. The processing device 11 may obtain the 2D images from the 2D image capturing device 12 and obtain the 3D images from the 3D image capturing device 13 and perform multi-modal image alignment calibration accordingly to obtain the transformation matrix between the camera coordinate system of the 2D image capturing device 12 and the camera coordinate system of the 3D image capturing device 13.

In addition, according to this transformation matrix and a focal length and a projection center of the 2D image capturing device 12, the processing device 11 may further obtain a transformation matrix between the image plane coordinate system of the 2D image capturing device 12 and the camera coordinate system of the 3D image capturing device 13, and may use this transformation matrix to overlay images generated by the two devices. The processing device 11 may further obtain a multi-modal signal (for example, including temperature information and spatial information, or including color information and spatial information) corresponding to a certain target from the overlay image. Said certain target may be determined by the processing device 11 according to certain algorithm (for example, face recognition algorithm) or determined by an operator, which is not limited in the present disclosure. Or, the processing device 11 may present the overlay image to an operator through a display, or output the overlay image to other multi-modal signal measurement application device.

Figure 2:
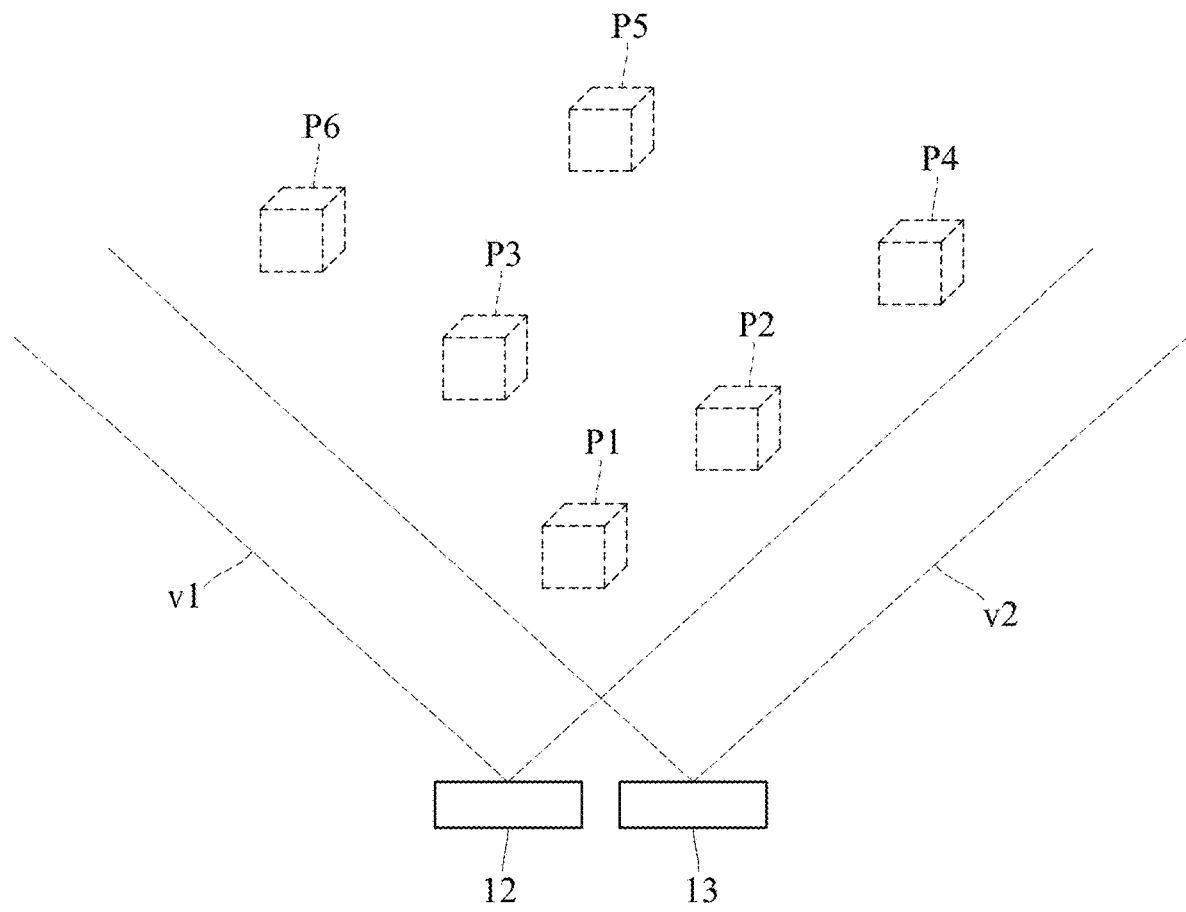
FIG. 2 is a schematic diagram of calibration positions according to an embodiment of the disclosure.

Please refer to both FIG. 1 and FIG. 2, wherein FIG. 2 is a schematic diagram of calibration positions according to an embodiment of the disclosure. As shown in FIG. 2, the calibration positions P1-P6 of the calibration object 14 are located in an overlapped region of a visual angle v1 of the 2D image capturing device 12 and a visual angle v2 of the 3D image capturing device 13, wherein the number of the calibration positions is at least six. More particularly, at each of the calibration positions P1-P6, the indicators 141a-141d of the calibration object 14 are visible for the 2D image capturing device 12 and the 3D image capturing device 13. The number of the 3D images may be the same as the number of the calibration positions P1-P6, and the number of the 2D images depends on a control method of the indicators 141a-141d of the calibration object 14.

In an implementation, the indicators 141a-141d of the calibration object 14 respectively have different colors or different temperatures, and are enabled simultaneously during photographing. The 2D image capturing device 12 is controlled to photograph the calibration object 14 placed at different calibration positions P1-P6 in turn to generate 2D images with the same number as the calibration positions P1-P6. Each 2D image includes image blocks corresponding to the indicators 141a-141d with different colors or/and different temperatures.

In another implementation, the indicators 141a-141d of the calibration object 14 are enabled in a certain order during a single photographing procedure to emit light or generate heat. The 2D image capturing device 12 is controlled to perform multiple photographing procedures on the calibration object 14 placed at the calibration positions P1-P6 in turn to generate a plurality of 2D images. For example, when the calibration object 14 is placed at any one of the calibration positions P1-P6, the indicator 141a is enabled and the 2D image capturing device 12 is controlled to generate the 2D image including an image block corresponding to the indicator 141a. Then, the indicator 141b is enabled and the 2D image capturing device 12 is controlled to generate the 2D image including an image block corresponding to indicator 141b. The generation of 2D images corresponding to the indicators 141c and 141d is based on the same concept as above and is not repeated herein. In this implementation, the number of the 2D images is N times the number of the calibration positions P1-P6, wherein N is the number of the indicators 141a-141d of the calibration object 14.

The control of the indicator 141a-141b of the calibration object 14, the photographing performed by the 2D image capturing device 12 and the photographing performed by the 3D image capturing device 13 described above may be controlled by an operator, or may be controlled by a controller storing corresponding control commands in a wired way or wireless way, which is not limited in the present disclosure.

Figure 3:
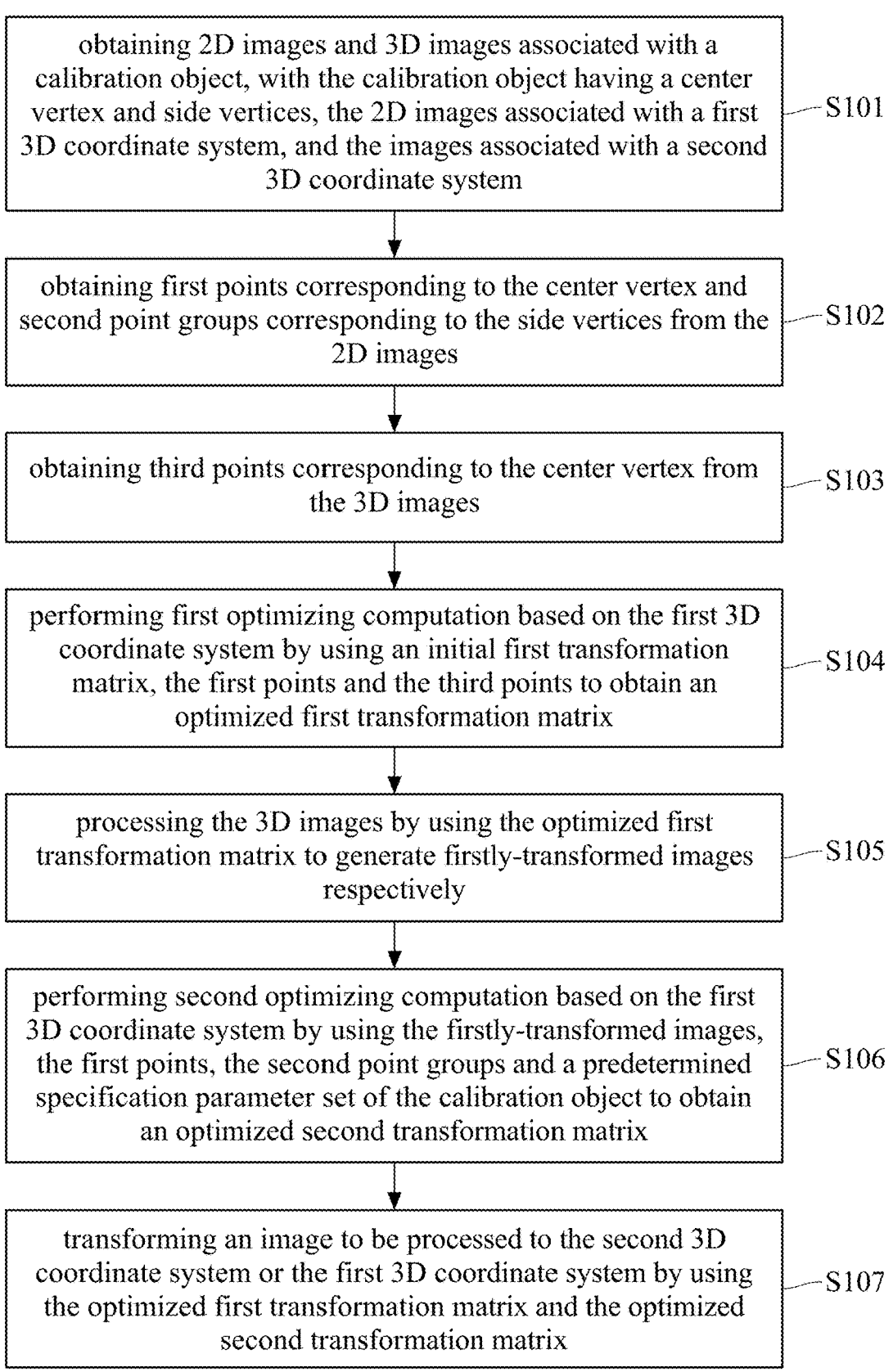
FIG. 3 is a flow chart of a multi-modal image alignment method according to an embodiment of the disclosure.

Please refer to both FIG. 1 and FIG. 3, wherein FIG. 3 is a flow chart of a multi-modal image alignment method according to an embodiment of the disclosure. As shown in FIG. 3, the multi-modal image alignment method includes step S101: obtaining 2D images and 3D images associated with a calibration object, with the calibration object having a center vertex and side vertices, the 2D images associated with a first 3D coordinate system, and the images associated with a second 3D coordinate system; step S102: obtaining first points corresponding to the center vertex and second point groups corresponding to the side vertices from the 2D images; step S103: obtaining third points corresponding to the center vertex from the 3D images; step S104: performing first optimizing computation based on the first 3D coordinate system by using an initial first transformation matrix, the first points and the third points to obtain an optimized first transformation matrix; step S105: processing on the 3D images by using the optimized first transformation matrix to generate firstly-transformed images respectively; step S106: performing second optimizing computation based on the first 3D coordinate system by using the firstly-transformed images, the first points, the second point groups and a predetermined specification parameter set of the calibration object to obtain an optimized second transformation matrix; and step S107: transforming an image to be processed to the second 3D coordinate system or the first 3D coordinate system by using the optimized first transformation matrix and the optimized second transformation matrix. It should be noted that the order of performing step S102 and step S103 is not limited in the present disclosure.

The multi-modal image alignment method shown in FIG. 3 may be applied to the multi-modal image alignment system 1 shown in FIG. 1, and particularly performed by the processing device 11. The following exemplarily elaborates steps S101-S107 with the operation of the multi-modal image alignment system 1.

In step S101, the processing device 11 obtains a plurality of 2D images and a plurality of 3D images of the calibration object 14. The method of obtaining the 2D images and the 3D images are described above, and is not repeated herein. The first 3D coordinate system in step S101 may be the camera coordinate system of the 2D image capturing device 12, the second 3D coordinate system in step S101 may be the camera coordinate system of the 3D image capturing device 13, the center vertex in step S101 may be the vertex of the calibration object 14 disposed with the indicator 141a, and the side vertices in step S101 may be the vertices of the calibration object 14 respectively disposed with the indicators 141b-141d.

In step S102, the processing device 11 obtains the first points corresponding to the center vertex and the second point groups corresponding to the side vertices from the 2D images. In the implementation where each 2D image includes the image blocks corresponding to the indicators 141a-141d with different colors or/and different temperatures, the processing device 11 may store a look-up table in advance, wherein the look-up table records colors or/and temperatures that the center vertex and side vertices respectively correspond to. The processing device 11 may find the image blocks with different colors or/and temperatures with image processing algorithm, wherein the image processing algorithm includes, but not limited to, for example, binarization and circle detection. The processing device 11 may determine that these image blocks respectively correspond to the center vertex disposed with the indicator 141a and the side vertices disposed with the indicators 141b-141d according to the look-up table. The center point of the image block corresponding to the center vertex may be regarded as the first point, and the center points of the image blocks corresponding to the side vertices may compose the second point group. More particularly, each of the first points and the points in the second point groups has 2D coordinates indicating a location in the image plane coordinate system of the 2D image capturing device 12.

In the implementation where the indicators 141a-141d are enabled in a certain order during each photographing procedure, the processing device 11 may store the certain order in advance. The processing device 11 may find image blocks having colors or/and temperatures with image processing algorithm, wherein the image processing algorithm includes, but not limited to, for example, binarization and circle detection. The processing device 11 may determine which of the center vertex and the side vertices that these image blocks in the 2D image correspond to according to the time of generation of the 2D image and the stored certain order. The center point of the image block corresponding to the center vertex may be regarded as the first point, and the center points of the image blocks corresponding to the side vertices may compose the second point group.

In step S103, the processing device 11 obtains a plurality of third points corresponding to the center vertex from the 3D images. More particularly, the third points have one-on-one relationships with the 3D images, and each of the third points has 3D coordinates indicating its location in the second 3D coordinate system. The processing device 11 may regard each of the 3D images as a target image and perform: obtaining three planes from the target image, wherein said three planes are adjacent to each other and three normal vectors of the three planes are perpendicular to each other;

and obtaining a point of intersection of said three planes as the corresponding one of the third points. More particularly, the processing device 11 may find all planes in the target image, find all combinations each of which is composed of three planes adjacent to each other, calculate normal vectors of the planes in each combination, filter out the combination of which the normal vectors are perpendicular to each other from the combinations, and calculate the point of intersection of the planes in the combination as the corresponding one of the third points.

In step S104, the processing device 11 uses the initial first transformation matrix, the first points and the third points to perform the first optimizing computation based on the first 3D coordinate system to obtain the optimized first transformation matrix. More particularly, the first points and the third points correspond to the above-mentioned plurality of calibration positions respectively. The processing device 11 may perform a distance calculation task on the first point and the third point corresponding to each of the calibration positions to obtain a plurality of calculation results, wherein the calculation results also correspond to the calibration positions respectively.

Figure 4:
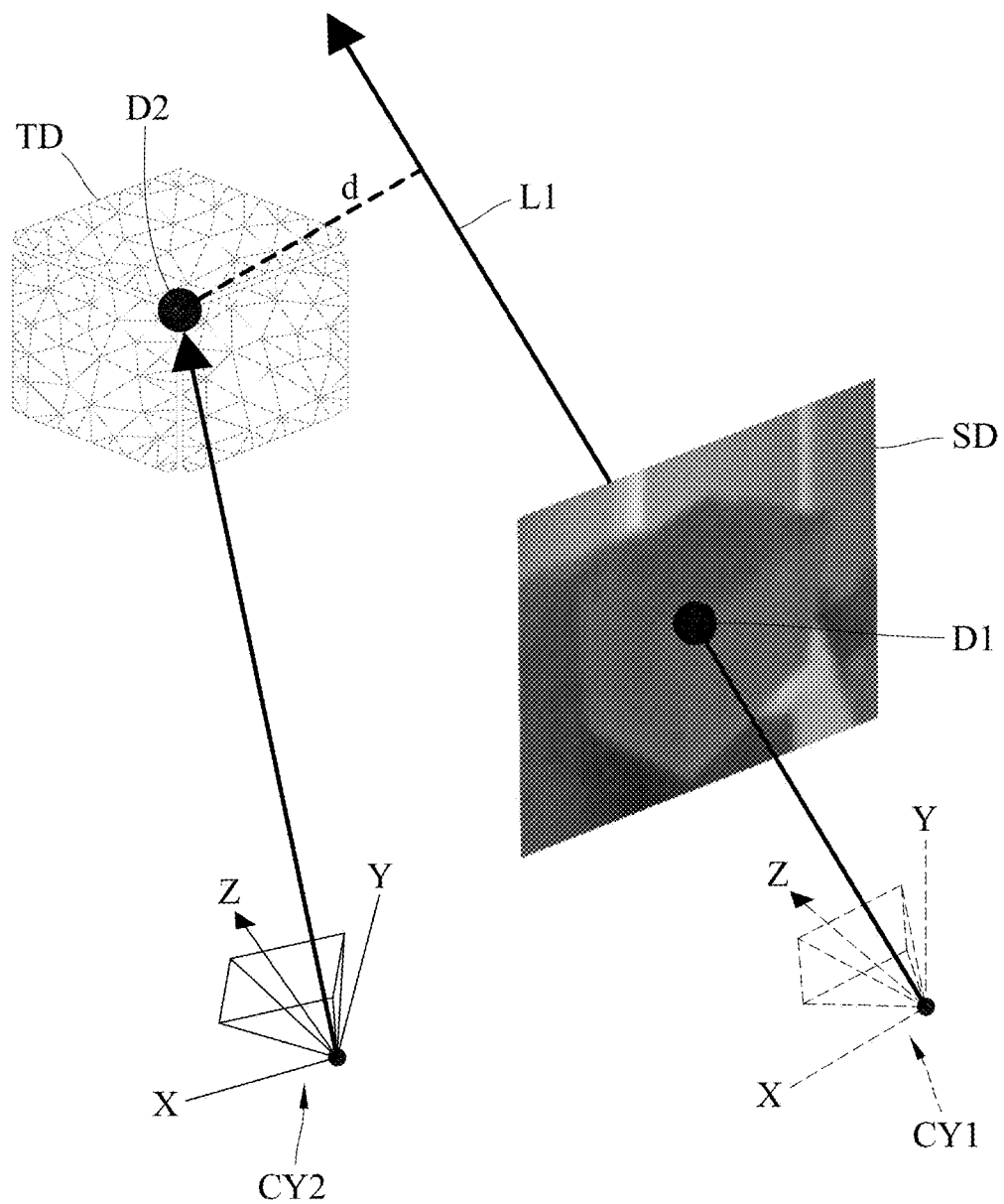
FIG. 4 is a schematic diagram of operation of a distance calculation task in a multi-modal image alignment method according to an embodiment of the disclosure.

Please refer to FIG. 1 and FIG. 4 for further elaboration of the distance calculation task, wherein FIG. 4 is a schematic diagram of operation of a distance calculation task in a multi-modal image alignment method according to an embodiment of the disclosure. As shown in FIG. 4, the first point D1 is the point in the 2D image SD corresponding to the center vertex of the calibration object 14, the 2D image SD corresponds to the first 3D coordinate system CY1 (the camera coordinate system of the 2D image capturing device 12), the third point D2 is the point in the 3D image TD corresponding to the center vertex of the calibration object 14, and the 3D image TD corresponds to the second 3D coordinate system CY2 (the camera coordinate system of the 3D image capturing device 13).

During the process of the distance calculation task, the processing device 11 may obtain a line L1 connecting the origin of the first 3D coordinate system CY1 and the first point D1, transform the third point D2 by using an initial first transformation matrix, and calculate the distance between the transformed third point D2 (transformed by the initial first transformation matrix) and the line L1 as the result of the distance calculation. The processing device 11 may iteratively adjust the initial first transformation matrix based on a convergence function (cost function), and regard the iteratively-adjusted initial first transformation matrix as the optimized first transformation matrix, wherein the convergence function is to minimize the sum of the distance calculation results corresponding to all distance calibration positions. Said convergence function may be presented as equation (1):

$$Min(\Sigma\{d=Dis(M_1 *Pt3D, Line)\}) \quad (1)$$

wherein $M_1$ represents the initial first transformation matrix, Pt3D represents the third point D2, and Line represents the line L1.

In particular, the initial first transformation matrix may include a rotation matrix and a displacement matrix, wherein the rotation matrix is associated with angle parameters of three axes, and the displacement matrix is associated with displacement parameters of three axes. To obtain a solution of the above-mentioned six parameters to obtain the optimized first transformation matrix, the number of the calibration positions is at least six. The detailed parameter compositions of the rotation matrix and the displacement matrix may be designed by a person having ordinary skill in the art based on the above six parameters and as required, and are not limited in the present disclosure.

In step S105 in FIG. 3, the processing device 11 uses the optimized first transformation matrix to transform the 3D images, and in step S106, the processing device 11 uses a predetermined specification parameter set of the 3D images transformed with the optimized first transformation matrix (firstly-transformed images), the first points, the second point groups and the calibration object to perform second optimizing computation based on the first 3D coordinate system to obtain an optimized second transformation matrix. Ideally, the optimized first transformation matrix obtained in step S104 should make the sum of the distance calculation results corresponding to all calibration positions approach 0, but in reality, the optimized first transformation matrix is an approximate solution. Therefore, the coordinate system which the 3D image transformed with the optimized first transformation matrix belongs to is still different from the first 3D coordinate system. By using the optimized second transformation matrix obtained in step S106 to transform the 3D image that has been transformed with the optimized first transformation matrix, the coordinate system which the 3D image corresponds to may be closer to the first 3D coordinate system.

Figure 5:
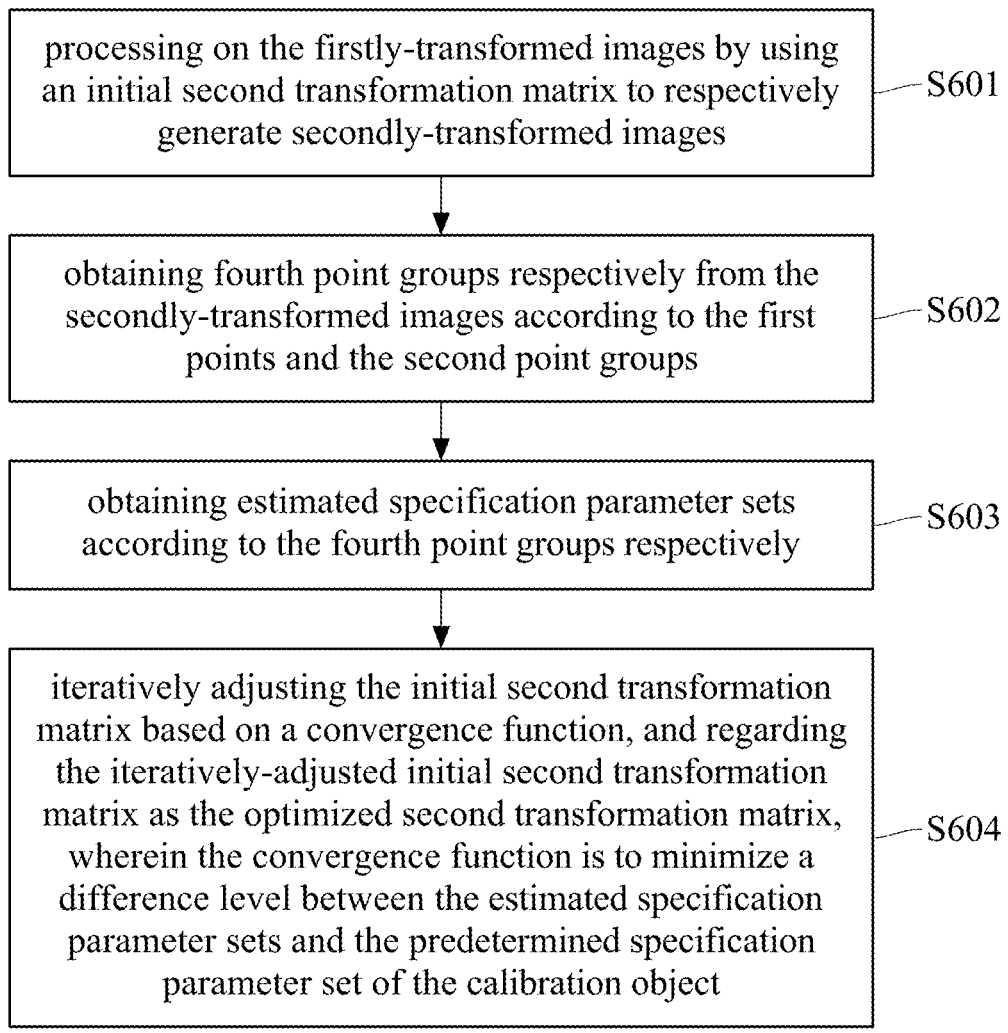
FIG. 5 is a flow chart of the second optimizing computation in the multi-modal image alignment method according to an embodiment of the disclosure.

Please refer to FIG. 1 and FIG. 5, wherein FIG. 5 is a flow chart of the second optimizing computation in the multi-modal image alignment method according to an embodiment of the disclosure. The second optimizing computation may include step S601: processing on the firstly-transformed images by using an initial second transformation matrix to respectively generate secondly-transformed images; step S602: obtaining fourth point groups respectively from the secondly-transformed images according to the first points and the second point groups; step S603: obtaining estimated specification parameter sets according to the fourth point groups respectively; and step S604: iteratively adjusting the initial second transformation matrix based on a convergence function, and regarding the iteratively-adjusted initial second transformation matrix as the optimized second transformation matrix, wherein the convergence function is to minimize a difference level between the estimated specification parameter sets and the predetermined specification parameter set of the calibration object.

More particularly, the secondly-transformed images, the first points, the second point groups, the fourth point groups and the estimated specification parameter sets may respectively correspond to the above-mentioned calibration positions where the calibration object is placed. In steps S602 and S603, the processing device 11 may perform a projection task on each of the first point, the corresponding second point group and the secondly-transformed image corresponding to the calibration positions to obtain a corresponding fourth point group, and then perform specification parameter estimation according to the corresponding fourth point group to obtain a corresponding estimated specification parameter set.

Figure 6:
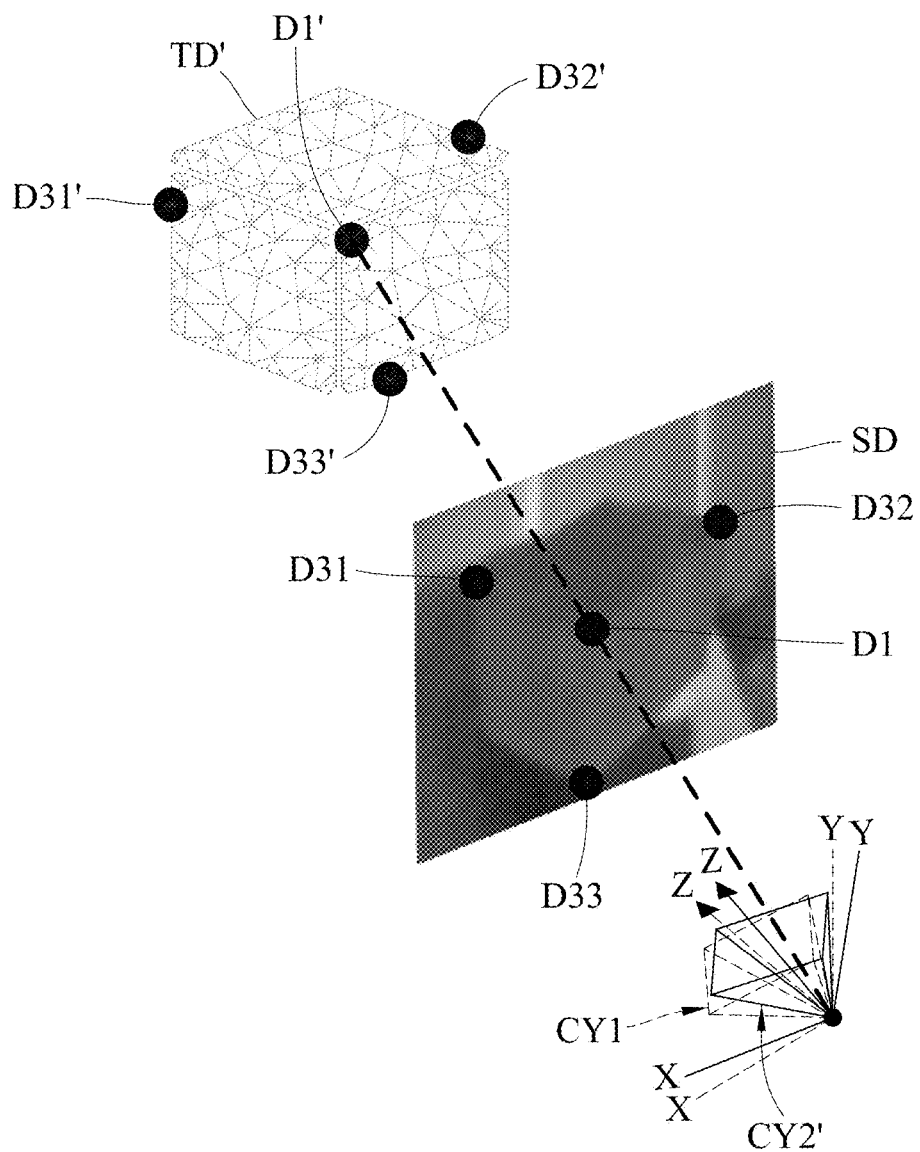
FIG. 6 is a schematic diagram of operation of a projection task in a multi-modal image alignment method according to an embodiment of the disclosure.

Please refer to FIG. 1 and FIG. 6 for further elaboration of the projection task, wherein FIG. 6 is a schematic diagram of operation of a projection task in a multi-modal image alignment method according to an embodiment of the disclosure. As shown in FIG. 6, a first point D1 is the point in the 2D image SD corresponding to the center vertex of the calibration object 14, second points D31-D33 are the points in the 2D image SD corresponding to the side vertices of the calibration object 14 and may compose the second point groups, the 2D image SD corresponds to the first 3D coordinate system CY1, and the 3D image transformed with the optimized first transformation matrix and the initial second transformation matrix (secondly-transformed images TD') corresponds to the coordinate system CY2'.

During the process of the projection task, the processing device 11 may project the first point D1 to the secondly-transformed image TD' to obtain a fifth point D1' corresponding to the first point D1, and project the second points D1-D33 to the secondly-transformed image TD' to obtain a plurality of sixth points D31'-D33' corresponding to the second points D31-D33 respectively. In another perspective, the processing device 11 may regard the point in the secondly-transformed image TD' having the x-coordinate and y-coordinate of the first point D1 as the fifth point D1', and may regard the points in the secondly-transformed image TD' having the x-coordinates and y-coordinates of the second points D31-D33 as the sixth points D31'-D33'. The fifth point D1' and the sixth points D31'-D33' may compose one of the fourth point groups. The method of obtaining the fourth point groups corresponding to the other calibration positions is based on the same concept and is not repeated herein.

Figure 7:
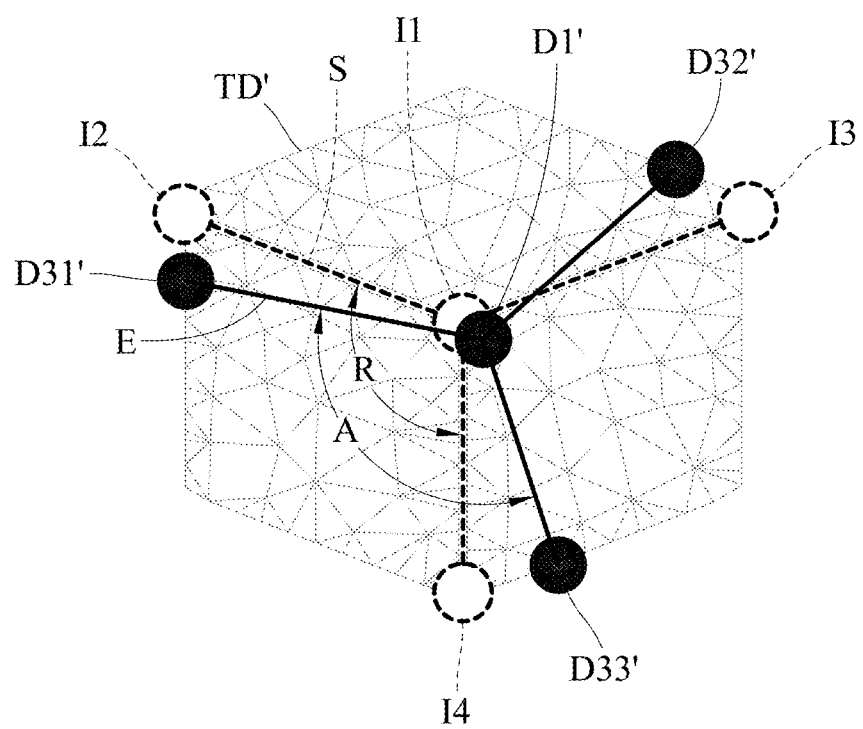
FIG. 7 is a schematic diagram of operation of a specification parameter estimation task in a multi-modal image alignment method according to an embodiment of the disclosure.

Please refer to FIG. 1, FIG. 5 and FIG. 7 for further elaboration of the specification parameter estimation operation. FIG. 7 is a schematic diagram of operation of a specification parameter estimation task in a multi-modal image alignment method according to an embodiment of the disclosure. During the process of the specification parameter estimation, the processing device 11 obtains a plurality of connecting lines between the fifth point D1' and the sixth points D31'-D33', and calculate a plurality of estimated lengths of the connecting lines and a plurality of estimated angles between the connecting lines, wherein the estimated lengths and the estimated angles compose one of the estimated specification parameter sets. FIG. 7 exemplarily marks the estimated length E of a connecting line between the fifth point D1' and the sixth point D31' and the angle A between the connecting line of the fifth point D1' and the sixth point D31' and a connecting line of the fifth point D1' and the sixth point D33'.

The following further elaborates step S604. The processing device 11 may iteratively adjust the initial second transformation matrix based on a convergence function, and regard the iteratively-adjusted initial second transformation matrix as the optimized second transformation matrix, wherein the convergence function is to minimize a difference level between the estimated specification parameter sets and the predetermined specification parameter set of the calibration object 14. The convergence function used in the second optimizing computation is different from the convergence function used in the first optimizing computation. The predetermined specification parameter set of the calibration object 14 may include a plurality of predetermined side lengths and a plurality of predetermined angles of the calibration object 14. Particularly, FIG. 7 exemplarily presents the ideal positions 11-14 of the fifth point D1' and the sixth points D31'-D33', wherein the predetermined side lengths may be side lengths S of a plurality of connecting lines between the ideal positions 11-14, and the predetermined angles may be angles R of the connecting lines between the ideal positions 11-14.

The difference level between the estimated specification parameter sets and the predetermined specification parameter set described in step S604 may be the weighted sum of the first value and the second value, wherein the first value is the sum of the differences between the estimated lengths and the respective one of the predetermined side lengths, and the second value is the sum of the differences between the estimated angles and the respective one of the predetermined angles. The convergence function of step S604 may be presented as equation (2):

$$\text{Min}(\alpha*(\Sigma((S_1-E)+(S_2-E_2)+(S_3-E_3))+\beta*\Sigma((R_1-A_1)+(R_2-A_2)+(R_3-A_3))) \quad (2)$$

wherein $S_1$-$S_3$ represent the predetermined side lengths, $R_1$-$R_3$ represent the predetermined angles, $E_1$-$E_3$ represent the estimated length, $A_1$-$A_3$ represent the estimated angles, and $\alpha$ and $\beta$ represent weights that may be adjusted according to requirements.

In particular, the initial second transformation matrix used for iteration to generate the optimized second transformation matrix may include a rotation matrix and a displacement matrix, or may only include a rotation matrix. The rotation matrix is associated with the angle parameters of three axes. The displacement matrix is associated with the displacement parameters of three axes. The detailed parameter compositions of the rotation matrix and the displacement matrix may be designed by a person having ordinary skill in the art based on the above six parameters and as required, and are not limited in the present disclosure.

Please refer to FIG. 1 and FIG. 3 again. After obtaining the optimized first transformation matrix and the optimized second transformation matrix through the above steps, in step S107, the processing device 11 may perform transformation by using the optimized first transformation matrix and the optimized second transformation matrix to transform the image to be processed from the second 3D coordinate system to the first 3D coordinate system, or from the first 3D coordinate system to the second 3D coordinate system. As described above, the first 3D coordinate system is the camera coordinate system of the 2D image capturing device 12.

More particularly, after transforming the image to be processed to the first 3D coordinate system, the processing device 11 may further transform the image to be processed from the first 3D coordinate system to the image plane coordinate system of the 2D image capturing device 12 by using the parameter matrix of the 2D image capturing device 12. The parameter matrix includes a local length parameter and a projection center parameter of the 2D image capturing device 12. The processing device 11 may combine the optimized first transformation matrix, the optimized second transformation matrix and the parameter matrix as the coordinate transformation matrix for performing the transformation between the image plane coordinate system of the 2D image capturing device 12 and the camera coordinate system of the 3D image capturing device 13 (the second 3D coordinate system), and store the coordinate transformation matrix in an internal memory. The processing device 11 may map the image generated by the 3D image capturing device 13 to the 2D image generate by the 2D image capturing device 12 by using this coordinate transformation matrix to generate an overlay image.

For example, said transformation between the image plane coordinate system of the 2D image capturing device 12 and the camera coordinate system of the 3D image capturing device 13 may be performed according to equations (3) and (4):

$$\begin{pmatrix} X_t \\ Y_t \\ Z_t \end{pmatrix} = M_2 * M_1 * \begin{pmatrix} X \\ Y \\ Z \end{pmatrix} \quad (3)$$

$$\begin{pmatrix} x_t \\ y_t \end{pmatrix} = \begin{pmatrix} f_x & 0 & c_x \\ 0 & f_y & c_y \end{pmatrix} * \begin{pmatrix} X_t/Z_t \\ Y_t/Z_t \\ 1 \end{pmatrix} \qquad (4)$$

wherein X, Y and Z represent the coordinates on the 3D image, $M_1$ represents the optimized first transformation matrix, $M_2$ represents the optimized second transformation matrix, $f_x$ and $f_y$ represent local length parameters of the 2D image capturing device 12, $c_x$ and $c_y$ represent projection center parameters of the 2D image capturing device 12, and $x_t$ and $y_t$ represent the coordinates on the 2D image.

Figure 8:
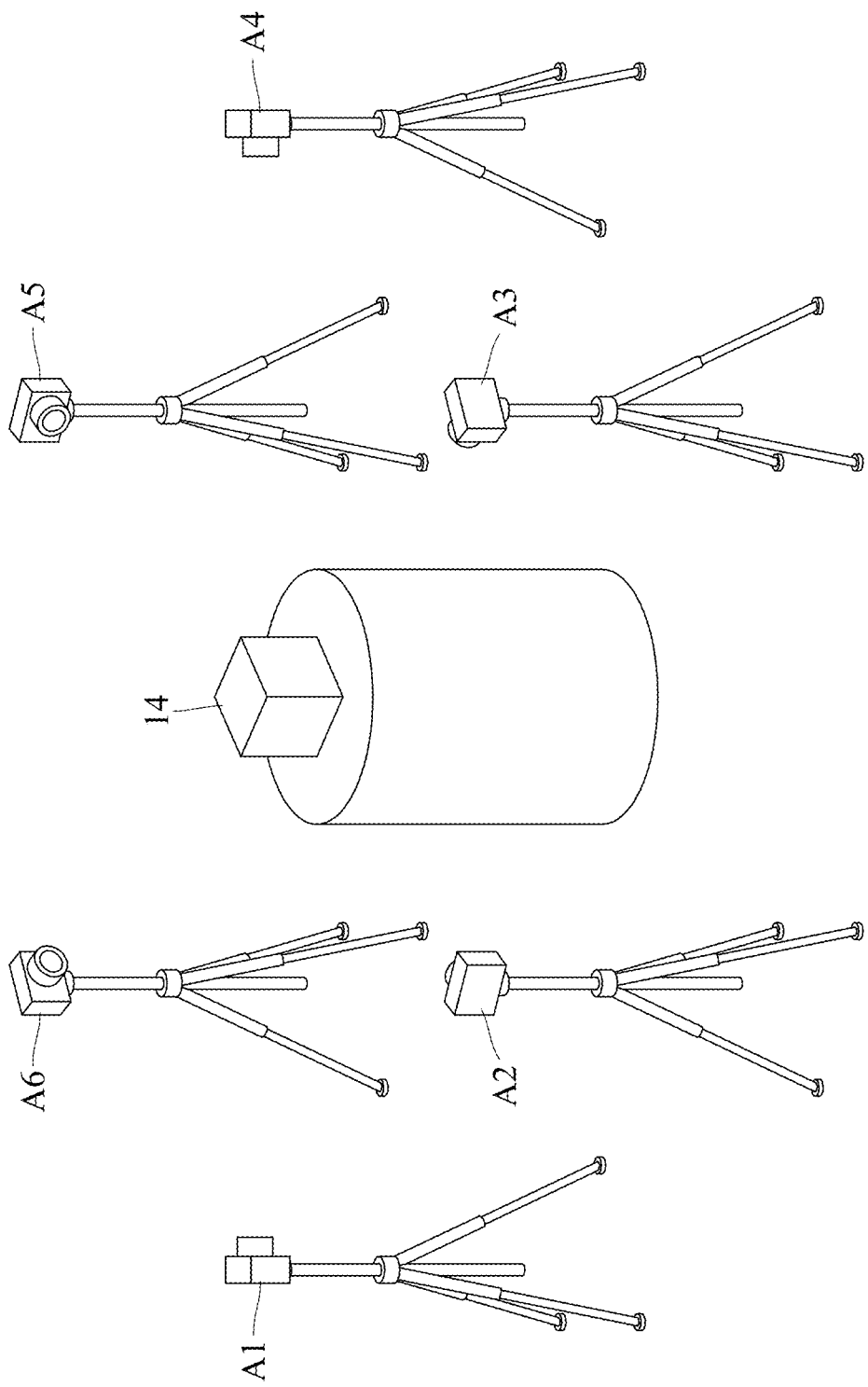
FIG. 8 is a schematic diagram of an operating environment of a multi-modal image alignment method according to an embodiment of the disclosure.

The multi-modal image alignment system and method described in the embodiments listed above may be applied to an operating environment disposed with a plurality of image capturing devices. Please refer to FIG. 1 and FIG. 8, wherein FIG. 8 is a schematic diagram of an operating environment of a multi-modal image alignment method according to an embodiment of the disclosure. The image capturing devices A1-A6 in FIG. 8 may be composed of 2D image capturing devices and 3D image capturing devices, wherein each of the 2D image capturing devices is located between two of the 3D image capturing devices and each of the 3D image capturing devices is located between two of the 2D image capturing devices. Any two neighbors of the image capturing devices A1-A6 may be used as the 2D image capturing device 12 and the 3D image capturing device 13 in the multi-modal image alignment system 1 described above. It should be noted here that FIG. 8 merely exemplarily illustrates the placement of the calibration object 14, the placement principles of the calibration object 14 are described in the embodiments listed above and not repeated herein.

Through the multi-modal image alignment method described in the embodiments listed above, the processing device 11 may obtain the transformation matrix between the coordinate system of any two adjacent capturing devices among the image capturing devices A1-A6, and make any one of the image capturing devices A1-A6 to transform to the coordinate system of the image capturing device separated therefrom with one or more image capturing device disposed in between through a cascade transformation structure.

For example, if the processing device 11 obtains a transformation matrix $M_{12}$ between the coordinate systems of the image capturing device A1 and the image capturing device $A_2$ and obtains a transformation matrix $M_{23}$ between the coordinate systems of the image capturing device $A_2$ and the image capturing device $A_3$ through the multi-modal image alignment method, the processing device 11 may transform the coordinates of an image generated by the image capturing device A1 to the coordinate system of the image capturing device $A_3$ through equation (5):

$$P_3 = M_{23} * M_{12} * P_1 \qquad (5)$$

wherein P1 represents the coordinates of the image generated by the image capturing device A1, P3 represents the coordinates of the image transformed into the coordinate system of the image capturing device $A_3$. Through the above cascade transformation structure, the processing device 11 may make all of the image capturing devices A1-A6 be transformed to the coordinate system of a specific one of the image capturing devices A1-A6.

Figure 9:
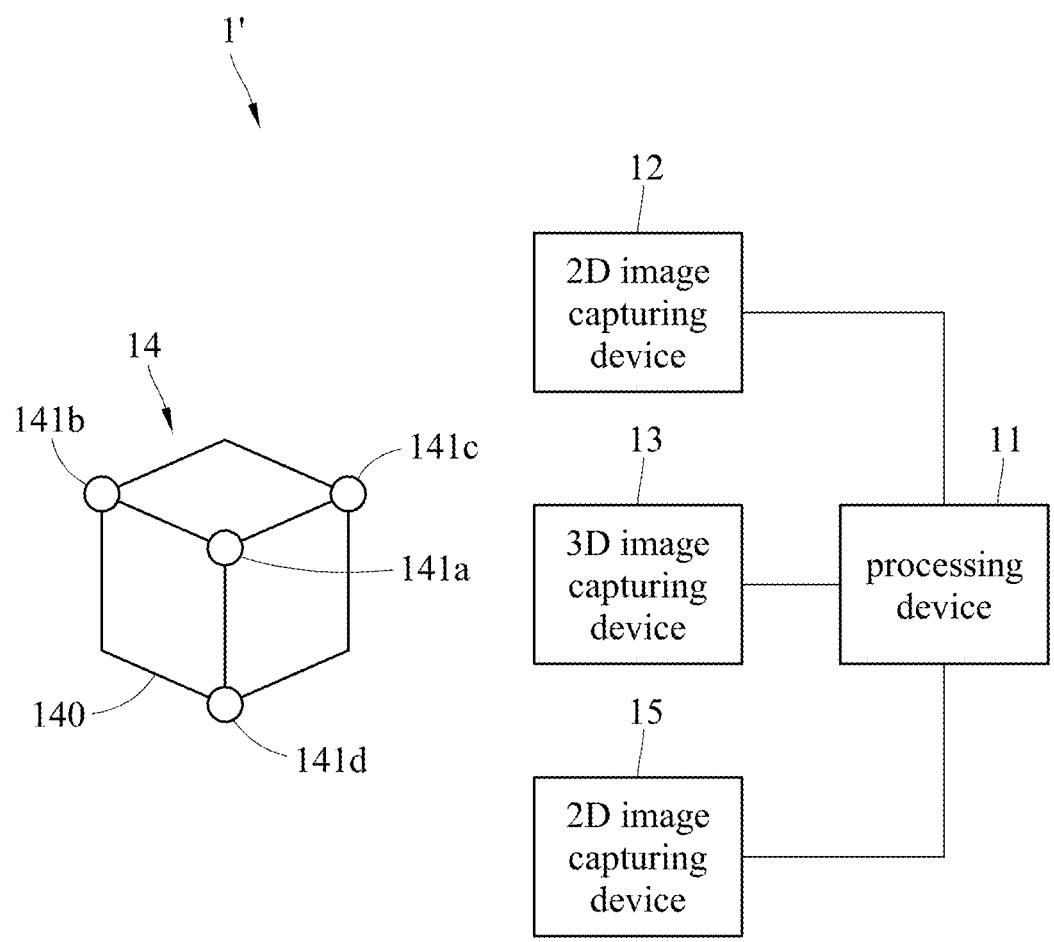
FIG. 9 is a function block diagram of a multi-modal image alignment system according to another embodiment of the disclosure.

In another embodiment, the multi-modal image alignment system may include three image capturing devices and may obtain the coordinate transformation matrices between the coordinate systems of the three image capturing devices. Please refer to FIG. 9, wherein FIG. 9 exemplarily illustrates a function block diagram of the multi-modal image alignment system 1' including three image capturing devices. As shown in FIG. 9, the multi-modal image alignment system 1' includes the processing device 11, two 2D image capturing devices 12 and 15, the 3D image capturing device 13 and the calibration object 14.

In comparison with the multi-modal image alignment system 1 shown in FIG. 1, the multi-modal image alignment system 1' further includes the 2D image capturing device 15. The 2D image capturing device 15, for example, an ambient light camera, a near infrared camera, a thermal imager, etc., may be connected to the processing device 11, have a camera coordinate system and an image plane coordinate system, and be controlled to photograph the calibration object 14 placed at different calibration positions in turn to generate a plurality of 2D images. In particular, the camera coordinate system and the image plane coordinate system of the 2D image capturing device 15 are different from the camera coordinate system and the image plane coordinate system of the 2D image capturing device 12.

In addition to the operations described in the embodiments listed above, the processing device 11 of the multi-modal image alignment system 1' may further obtain the coordinate transformation matrix between the camera coordinate system of the 2D image capturing device 15 and the camera coordinate system of the 3D image capturing device 13 according to the 2D images associated with the calibration object 14 generated by the 2D image capturing device 15 and the 3D images associated with the calibration object 14 generated by the 3D image capturing device 13 as described above. The processing device 11 may perform the transformation between the camera coordinate system of the 2D image capturing device 12 and the camera coordinate system of the 2D image capturing device 15 by using the coordinate transformation matrix and the optimized first and second transformation matrices described in the embodiments listed above. The processing device 11 may perform the transformation between the image plane coordinate system of the 2D image capturing device 12 and the image plane coordinate system of the 2D image capturing device 15 by using the coordinate transformation matrix, the optimized first and second transformation matrices described in the embodiments listed above, the parameter matrix of the 2D image capturing device 12 and the parameter matrix of the 2D image capturing device 15.

Figure 10:
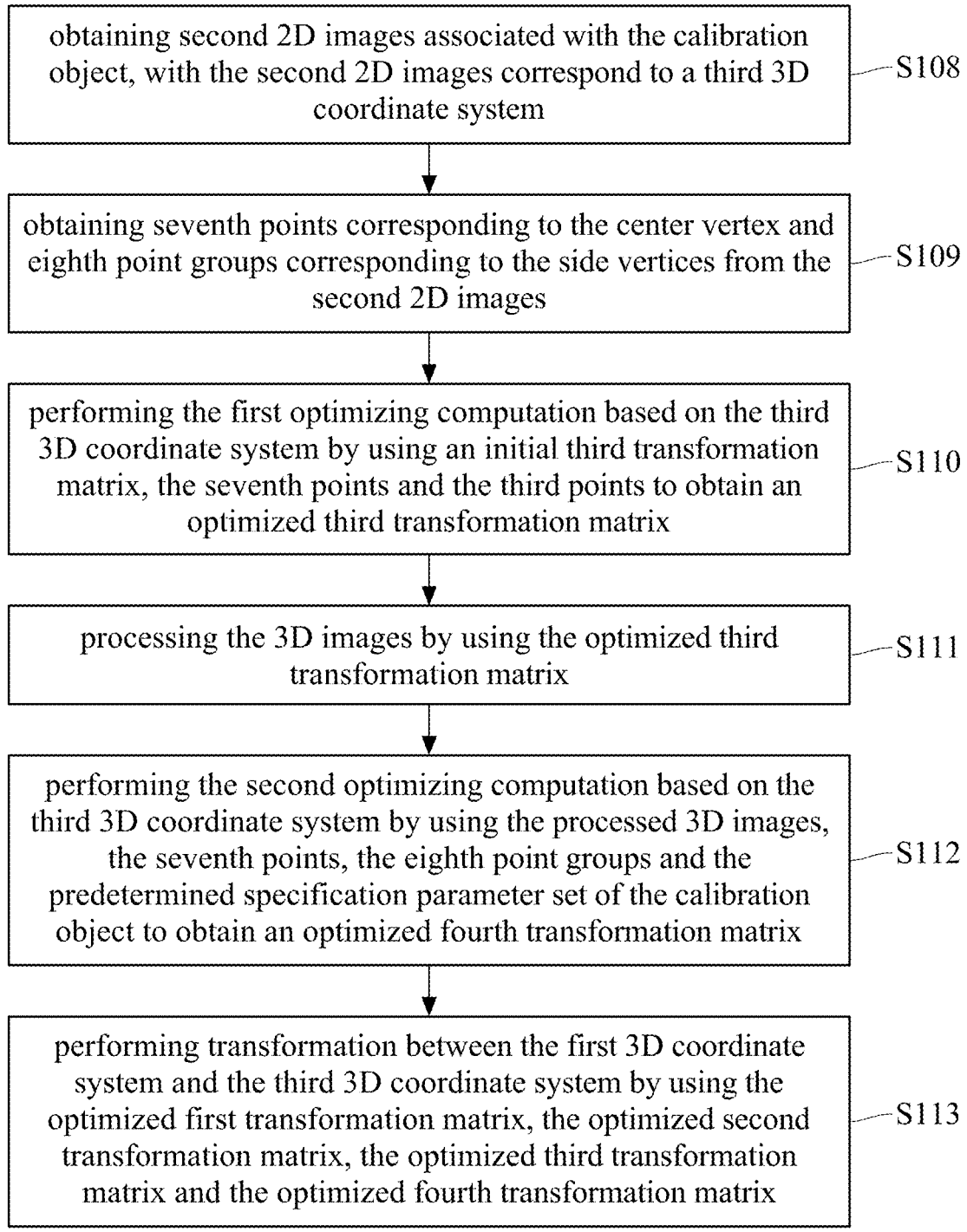
FIG. 10 is a flow chart of the second optimizing computation in the multi-modal image alignment method according to another embodiment of the disclosure.

The following further elaborates the multi-modal image alignment method applied to the multi-modal image alignment system 1'. Please refer to FIG. 3, FIG. 9 and FIG. 10, wherein FIG. 10 is a flow chart of the multi-modal image alignment method according to another embodiment of the disclosure. The multi-modal image alignment method applied to the multi-modal image alignment system 1' may include steps S101-S107 shown in FIG. 3 and the following steps shown in FIG. 10: step S108: obtaining second 2D images associated with the calibration object, with the second 2D images correspond to a third 3D coordinate system; step S109: obtaining seventh points corresponding to the center vertex and eighth point groups corresponding to the side vertices from the second 2D images; step S110: performing the first optimizing computation based on the third 3D coordinate system by using an initial third transformation matrix, the seventh points and the third points to obtain an optimized third transformation matrix; step S111: processing on the 3D images by using the optimized third transformation matrix; step S112: performing the second optimizing computation based on the third 3D coordinate system by using the processed 3D images, the seventh points, the eighth point groups and the predetermined specification parameter set of the calibration object to obtain an optimized fourth transformation matrix; and step S113: performing transformation between the first 3D coordinate system and the third 3D coordinate system by using the optimized first transformation matrix, the optimized second transformation matrix, the optimized third transformation matrix and the optimized fourth transformation matrix. It should be noted here that the present disclosure does not limit the order of performing steps S101 and S108, does not limit the order of performing step S102, step S103 and step S109, and also does not limit the order of performing the combination of steps S104-S106 and the combination of steps S110-S112.

Step S101-step S113 may be performed by the processing device 11 of the multi-modal image alignment system 1'. The implementation of steps S108-S112 are respectively based on the same concept as steps S101, S102, S104-S106. In other words, steps S101, S102, S104-S106 are for obtaining the transformation relationship between the first 3D coordinate system of the 2D image capturing device 12 and the second 3D coordinate system of the 3D image capturing device 13, and steps S108-S112 are for obtaining the transformation relationship between the third 3D coordinate system of the 2D image capturing device 15 and the second 3D coordinate system based on the same concept, which is not repeated herein. In step S113, the processing device 11 may use the optimized first transformation matrix, the optimized second transformation matrix, the optimized third transformation matrix and the optimized fourth transformation matrix to perform transformation between the first 3D coordinate system and the third 3D coordinate system. More particularly, the optimized first transformation matrix and the optimized second transformation matrix may compose a coordinate transformation matrix $M_a$ for transforming an image to be processed from the second 3D coordinate system to the first 3D coordinate system, and the optimized third transformation matrix and the optimized fourth transformation matrix may compose a coordinate transformation matrix $M_b$ for transforming an image to be processed from the second 3D coordinate system to the third 3D coordinate system. The processing device 11 may perform algebra calculation with the coordinate transformation matrices $M_a$ and $M_b$ to obtain a coordinate transformation matrix Me for transforming an image to be processed from the first 3D coordinate system into the third 3D coordinate system, and is, for example, presented as equation (6):

$$M_c = M_b * M_a^{-1} \quad (6)$$

More particularly, the coordinate transformation matrix $M_a$ may further include the parameter matrix of the 2D image capturing device 12, the coordinate transformation matrix $M_b$ may further include the parameter matrix of the 2D image capturing device 15. The relationship between the optimized first transformation matrix, the optimized second transformation matrix and the parameter matrix included in the coordinate transformation matrix $M_a$ is as equations (3) and (4) shown above, the relationship between the optimized third transformation matrix, the optimized fourth transformation matrix and the parameter matrix included in the coordinate transformation matrix $M_b$ is also the same, which is not repeated herein. In this implementation, the coordinate transformation matrix Me obtained through the algebra calculation described above may be used to perform the transformation between the image plane coordinate system of the 2D image capturing device 12 and the image plane coordinate system of the 2D image capturing device 15.

By using the coordinate transformation matrices $M_a$, $M_b$ and $M_c$, the processing device 11 may map the images generated by any two of the 2D image capturing devices 12 and 15 and the 3D image capturing device 13 to the image generated by the remaining one of the 2D image capturing devices 12 and 15 and the 3D image capturing device 13. For example, by using the coordinate transformation matrix $M_b$ and the coordinate transformation matrix $M_c$, the processing device 11 may map the image generated by the 3D image capturing device 13 and the image generated by the 2D image capturing device 12 to the image generated by the 2D image capturing device 15 to generate an overlay image. Accordingly, the multi-modal image alignment system 1' may obtain three types of information of a specific target from the overlay image all at once. For example, if the three image capturing devices of the multi-modal image alignment system 1' are respectively a thermal imager, an ambient light camera and a 3D point cloud sensor, the processing device 11 of the multi-modal image alignment system 1' may obtain the temperature, color and spatial location information of the specific target from the overlay image all at once.

In view of the above description, the multi-modal image alignment method provided in the disclosure may obtain a transformation matrix between different coordinate systems through two times of the optimizing computation, and may achieve alignment with high precision without using complicate machine learning training. In comparison with the traditional method of using planar checkerboard calibration plate as the basis for obtaining the transformation matrix, using 3D corner features as the basis for obtaining the transformation matrix requires relatively less sampling data, that is, relatively short sampling time. The multi-modal image alignment system in the disclosure may also have the advantageous effects of less required sampling data and short sampling time, and by disposing a special 3D calibration object with indicators, the system may achieve automatic extraction of feature points in 2D/3D images.

What is claimed is:

1. A multi-modal image alignment system, comprising:
   a calibration object, comprising:
   a main body having a center vertex and a plurality of side vertices; and
   a plurality of indicators respectively disposed on the center vertex and the plurality of side vertices;
   a 2D image capturing device having a first 3D coordinate system, and configured to generate a plurality of 2D images associated with the calibration object;
   a 3D image capturing device having a second 3D coordinate system, and configured to generate a plurality of 3D images associated with the calibration object; and
   a processing device connected to the 2D image capturing device and the 3D image capturing device, and configured to obtain a coordinate transformation matrix according to the plurality of 2D images and the plurality of 3D images, and transform an image to be processed to the second 3D coordinate system or the first 3D coordinate system by using the coordinate transformation matrix.

2. The multi-modal image alignment system according to claim 1, further comprising:
   another 2D image capturing device connected to the processing device, having a third 3D coordinate system, and configured to generate a plurality of second 2D images associated with the calibration object;

wherein the processing device is further configured to obtain another coordinate transformation matrix according to the plurality of second 2D images and the plurality of 3D images, and perform transformation between the first 3D coordinate system and the third 3D coordinate system using the two coordinate transformation matrices.

3. The multi-modal image alignment system according to claim 1, wherein the plurality of indicators have different colors or temperatures.

4. The multi-modal image alignment system according to claim 1, wherein to obtain the coordinate transformation matrix, the processing device is further configured to:
  obtain a plurality of first points corresponding to the center vertex and a plurality of second point groups corresponding to the plurality of side vertices from the plurality of 2D images;
  obtain a plurality of third points corresponding to the center vertex from the plurality of 3D images;
  perform first optimizing computation based on the first 3D coordinate system by using an initial first transformation matrix, the plurality of first points and the plurality of third points to obtain an optimized first transformation matrix;
  process on the plurality of 3D images by using the optimized first transformation matrix to generate a plurality of firstly-transformed images respectively; and
  perform second optimizing computation based on the first 3D coordinate system by using the plurality of firstly-transformed images, the plurality of first points, the plurality of second point groups and a predetermined specification parameter set of the calibration object to obtain an optimized second transformation matrix;
  wherein the coordinate transformation matrix comprises the optimized first transformation matrix and the optimized second transformation matrix.

5. The multi-modal image alignment system according to claim 4, wherein the plurality of first points and the plurality of third points respectively correspond to a plurality of calibration positions where the calibration object is placed, and to perform the first optimizing computation, the processing device is further configured to:
  perform a distance calculation on the first point and the third point corresponding to each of the plurality of calibration positions to obtain a plurality of calculation results respectively corresponding to the plurality of calibration positions, wherein the distance calculation comprises:
    obtaining a line connecting an origin of the first 3D coordinate system and the first point corresponding to each of the plurality of calibration positions;
    transforming the third point corresponding to each of the plurality of calibration positions by using the initial first transformation matrix; and
    calculating a distance between the third point transformed by the initial first transformation matrix and the line; and
  iteratively adjusting the initial first transformation matrix based on a convergence function, and regarding the iteratively-adjusted initial first transformation matrix as the optimized first transformation matrix, wherein the convergence function is to minimize a sum of the plurality of calculation results.

6. The multi-modal image alignment system according to claim 4, wherein to perform the second optimizing computation, the processing device is further configured to:
  process on the plurality of firstly-transformed images by using an initial second transformation matrix to respectively generate a plurality of secondly-transformed images;
  obtain a plurality of fourth point groups respectively from the plurality of secondly-transformed images according to the plurality of first points and the plurality of second point groups;
  obtain a plurality of estimated specification parameter sets according to the plurality of fourth point groups respectively; and
  iteratively adjust the initial second transformation matrix based on a convergence function, and regard the iteratively-adjusted initial second transformation matrix as the optimized second transformation matrix, wherein the convergence function is to minimize a difference level between the plurality of estimated specification parameter sets and the predetermined specification parameter set of the calibration object.

7. The multi-modal image alignment system according to claim 6, wherein the plurality of secondly-transformed images, the plurality of first points, the plurality of second point groups respectively correspond to a plurality of calibration positions where the calibration object is placed, and to obtain the plurality of fourth point groups, the processing device is further configured to:
  perform steps on a first point, a second point group and a secondly-transformed image corresponding to each of the plurality of calibration positions, wherein the steps comprise:
    projecting the first point onto the secondly-transformed image to obtain a fifth point corresponding to each of the plurality of calibration positions; and
    projecting a plurality of points in the second point groups onto the secondly-transformed image to obtain a plurality of sixth points corresponding to each of the plurality of calibration positions;
  wherein the fifth point and the plurality of sixth points form one of the plurality of fourth point groups.

8. The multi-modal image alignment system according to claim 7, wherein to obtain the plurality of estimated specification parameter sets, the processing device is further configured to:
  perform specification parameter estimation on each of the plurality of fourth point groups to obtain one of the plurality of estimated specification parameter sets, wherein the specification parameter estimation comprises:
    obtaining a plurality of connecting lines between the fifth point and the plurality of sixth points; and
    calculating a plurality of estimated lengths of the plurality of connecting lines and a plurality of estimated angles between the plurality of connecting lines;
  wherein the predetermined specification parameter set comprises a plurality of predetermined side lengths and a plurality of predetermined angles of the calibration object, the difference level between the plurality of estimated specification parameter sets and the predetermined specification parameter set is a weighted sum of a first value and a second value, the first value is a sum of differences respectively between the plurality of estimated lengths and the plurality of predetermined side lengths, and the second value is a sum of differences respectively between the plurality of estimated angles and the plurality of predetermined angles.

9. The multi-modal image alignment system according to claim 4, wherein to obtaining the plurality of third points, the processing device is further configured to:
- regard each of the plurality of 3D images as a target image;
- obtain three planes in the target image, wherein the planes are adjacent to each other and three normal vectors of the three planes are perpendicular to each other; and
- obtain a point of intersection of the planes as one of the plurality of third points.

10. The multi-modal image alignment system according to claim 1, wherein the first 3D coordinate system is a camera coordinate system of a 2D image capturing device, the processing device is further configured to transform the image to be processed from the first 3D coordinate system to an image plane coordinate system of the 2D image capturing device using a parameter matrix of the 2D image capturing device, and the parameter matrix comprises a local length parameter and a projection center parameter of the 2D image capturing device.

* * * * *